Oct. 21, 1930.  E. R. EVANS  1,778,827
ELECTRICAL SIGNALING OR CONTROLLING SYSTEM
Filed Nov. 22, 1926    2 Sheets-Sheet 1
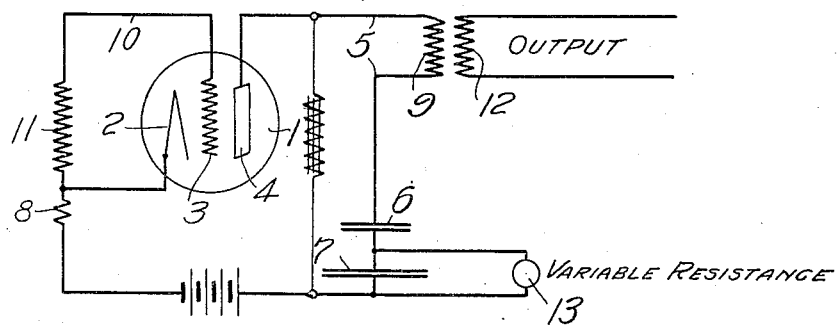
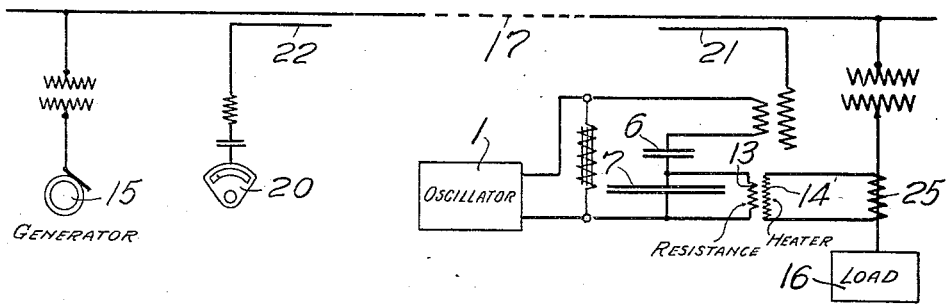
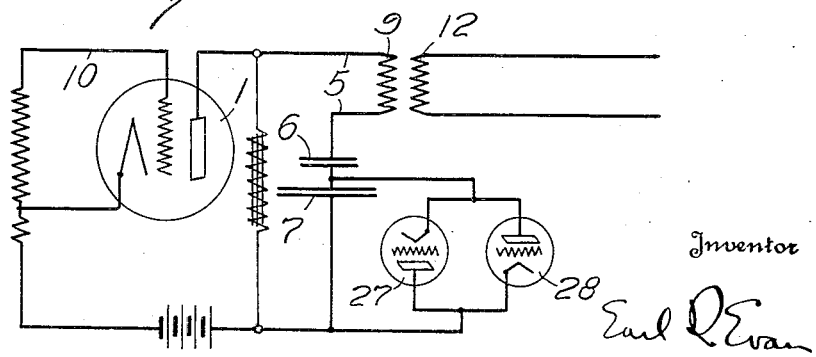
Inventor
Earl R. Evans Inventor
Earl R Evans Patented Oct. 21, 1930

1,778,827

UNITED STATES PATENT OFFICE

EARL R. EVANS, OF WASHINGTON, DISTRICT OF COLUMBIA, ASSIGNOR TO WESTINGHOUSE ELECTRIC AND MANUFACTURING COMPANY, A CORPORATION OF PENNSYLVANIA

ELECTRICAL SIGNALING OR CONTROLLING SYSTEM

Application filed November 22, 1926. Serial No. 150,128.

My invention relates to electrical signaling or controlling systems and particularly to systems in which high-frequency oscillators are employed, such as those utilizing carrier currents for signaling or controlling over the line circuits of power distribution systems.

It has been proposed to transmit signals between widely separated stations in electrical distribution systems or to control apparatus in one station in accordance with conditions at some other point by employing carrier currents superimposed upon the line circuits. The apparatus employed or proposed for this purpose has been relatively complicated and expensive and it is the object of my invention to simplify and improve systems of this general character.

Another object of my invention is to provide, in a system of this character, means for controlling the frequency of the carrier current in accordance with the magnitude of a measured quantity instead of merely stopping the flow of current or otherwise modifying it without changing its frequency. If the frequency of the carrier current bears a definite relation to the magnitude of the measured quantity, a frequency-responsive device actuated by the carrier current will be controlled in accordance with fluctuations of the quantity measured.

While I consider that my invention is particularly adapted for carrier-current metering or control apparatus for power distribution system, it is not limited to such applications. For example, the apparatus may be employed in connection with an oscillator which must be kept at constant frequency. A condition which would change the frequency of the oscillator may be made to affect the apparatus of my invention in such a manner as to secure proper compensation, and thereby keep the frequency of the oscillator constant.

Other objects and advantages of my invention will appear from the following detailed description of the embodiments thereof shown on the attached drawings.

In the drawings:

Fig. 1 is a diagrammatic view of an electrical system embodying my invention;

Fig. 2 is a similar view of a power distribution system embodying my invention.

Figs. 3, 4 and 5 are views of further modifications.

Figure 4:
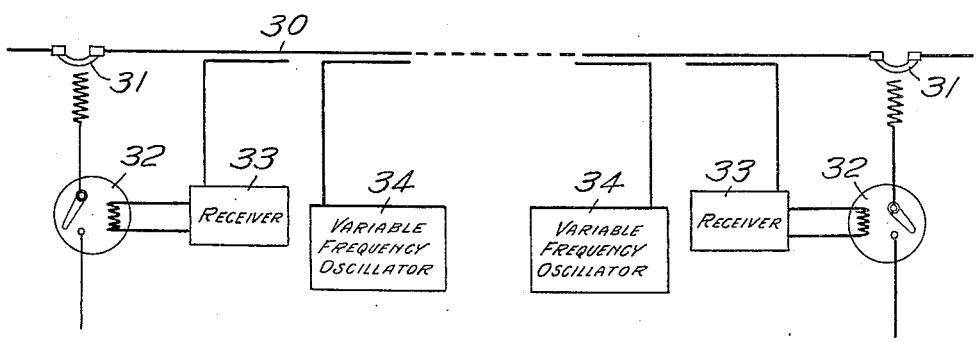

Referring to Fig. 1, the electrical system shown comprises an oscillator 1, having a cathode 2, and anodes 3 and 4, all of usual construction. The plate circuit 5 includes condensers 6 and 7 and inductances 8 and 9. The condensers and inductances are so chosen that the plate circuit is resonant at the desired frequency of the oscillator. The grid circuit 10, is coupled to the plate circuit by means of an inductance 11, which is mutually inductively related to the inductance 8 in the plate circuit. The plate circuit is coupled to an output circuit by means of an inductance coil 12 which is mutually inductively related to the inductance 9.

In order to control the frequency of the oscillator, a variable resistance 13 is connected in shunt relation to the condenser 7. The effective capacity in the plate circuit 5, depends upon the value of the resistance 13 and consequently the frequency of the oscillator is affected by variations in the resistance. The effect of the variations of the resistance 13 upon the frequency of the oscillator is increased if the condenser 7 is larger than the condenser 6, as shown.

The value of the resistance may be varied in any desired manner to control the frequency of the oscillator or if the frequency of the oscillator is varied by some other condition, the resistance may be arranged to compensate for the other conditions and maintain the frequency of the oscillator constant. For example, the characteristics of the condensers 6 and 7 or of the inductances 8 and 9 may not be constant. If the dielectric of the condensers or the losses in the condensers or inductances affect the characteristics of the resonant circuit sufficiently to cause the frequency of the oscillator to change, the resistance 13 may be arranged to compensate for this variation.

For example, if the heating of the condensers or inductances causes a change in the characteristic thereof and consequently in the frequency of the oscillator, the variable resistance 13 may be arranged to vary in accordance with the heating effect, and thereby maintain the frequency of the oscillator constant.

The variation of the resistance 13 may be obtained as shown in Fig. 2, by the use of a heater or resistance winding 14, if the resistance 13 is formed of a material having an appreciable temperature coefficient of resistance. The temperature coefficient and the size of the heater are so chosen as to obtain the desired change of resistance. The heater may be omitted if the current in the plate circuit which flows through the resistance 13 is sufficient to heat the resistance to the desired temperature.

In the system shown in Fig. 2, the oscillator is so controlled as to obtain a variation of frequency corresponding to changes in the electrical current in an associated circuit. The electrical system shown comprises a generator 15, supplying energy to a load 16, at a remote point through the transmission line 17. The oscillator 1 is located adjacent the load 16, and an electro-responsive instrument 20, is arranged adjacent the generator 15, to be controlled by the oscillator in accordance with changes in the load current.

The oscillator 1 and the instrument 20 are electrostatically coupled to the transmission line 17 through the antenna connections 21 and 22. It is assumed that the frequency of the oscillator is sufficiently high so that the carrier current superimposed upon the transmission line 17 will be independent of the load current supplied by the generator 15.

The control of the oscillator is effected by a current transformer 25 in the load circuit and having its terminals connected to the heater 14. The instrument 20 may be a frequency-responsive instrument connected in a resonant circuit as indicated so that variations in the frequency of the carrier current affect the current flowing through the instrument and the indication thereof.

It will be apparent that variations of the load current traversing the current transformer 25, change the heating effect of the heater 14. Since the resistance 13 has an appreciable temperature coefficient of resistance the value of the resistance depends upon its temperature and consequently upon the heating effect of the heater coil 14. The changes in the value of the resistance 13 affect the frequency of the oscillator 1 and thereby alter the frequency of the carrier current and the indications of the instrument 20. The instrument 20 may be calibrated directly in terms of load current.

Various forms of resistances may be employed to control the frequency of the oscillator. In Fig. 3, is shown an electrical system similar to that shown in Fig. 1, in which the resistor which is connected in shunt relation to the condenser 7, comprises two electro-ionic devices 27 and 28, having their plate circuits in shunt relation to the condenser. The plate resistance of the electro-ionic devices 27 and 28 is varied by varying the cathode heating current or the grid potentials in any desired manner to control the frequency of the oscillator 1.

In Fig. 4, a further modification of the invention is shown, the oscillator being indicated diagrammatically. In the system shown in Fig. 4, a power distribution circuit 30 extending between two electrical stations in a distribution system is provided with a circuit breaker 31, a control relay 32, a receiver 33 and an oscillator 34, at each end thereof. The receivers 33 are arranged to control the relay 32 upon the occurrence of predetermined conditions in the circuit to trip the circuit interrupters 31 and disconnect the circuit from the remainder of the system. The oscillators 34 are similar to those shown in Figs. 1 and 3 and normally generate the currents of the same frequency.

The frequency of each oscillator depends upon the current traversing the circuit at the point where the oscillator is located. Under normal conditions the currents are equal at both ends of the distribution circuit 30.

If a fault occurs upon the circuit 30, the currents at the ends of the circuit are no longer equal and the oscillators 34 will generate currents of different frequencies. Under these conditions, a low frequency beat note is produced to which the receivers 33 are responsive, thereby opening the circuit interrupters 31 and disconnecting the faulty transmission circuit.

Figure 5:
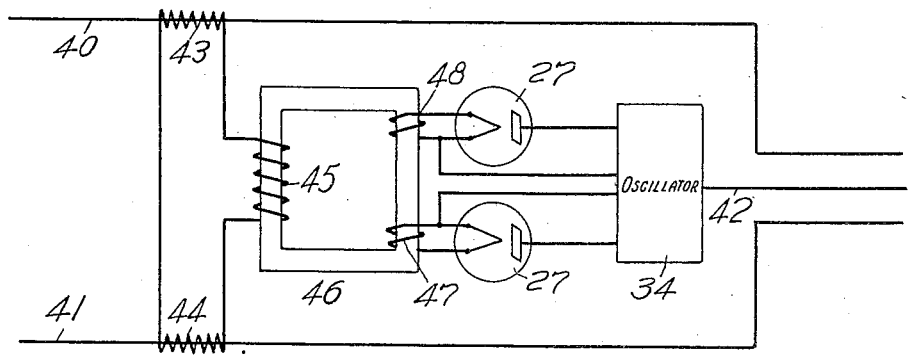

The control of the oscillator may be effected in response to various other conditions, in electrical systems. For example, as illustrated in Fig. 5, the oscillator may be responsive to the relative values of the currents flowing in two parallel circuits.

An electrical system comprises two parallel transmission circuits 40 and 41. The oscillator 34 is arranged to superimpose a carrier current upon either or both of the circuits 40 and 41 by means of an antenna, in the same manner as shown in Figs. 2 and 4. The variable resistance control elements 27 associated with the oscillator are responsive to the relative values of the currents flowing in the circuits 40 and 41.

Two current transformers 43 and 44 are connected in the circuits 40 and 41. The secondary circuits of the current transformers 43 and 44 are connected in series relation with a primary winding 45 of a transformer 46. The secondary windings 43 and 44 are normally in opposition so that no current traverses the winding 45.

The transformer 46 is provided with two secondary windings 47 and 48 for energizing the cathodes of the thermo-ionic devices. When the currents traversing the circuits 40 and 41 are equal the thermo-ionic devices 27 have a practically infinite resistance and the oscillator 34 generates a carrier current of normal frequency. If the currents traversing the circuits 40 and 41 become unequal for any reason, such as a fault upon one of the circuits the cathodes of the thermo-ionic devices 27 are energized thereby reducing the internal resistance thereof and altering the frequency of the oscillator 34. This alteration in frequency may be utilized in any desired manner for producing an indication of the abnormal condition or for disconnecting the circuit as shown in the modification of Fig. 4.

I do not consider the invention is limited to the specific forms that are shown and described herein and accordingly I do not wish that the invention be limited in scope except as indicated in the appended claims.

I claim:

1. An electrical system comprising a power distribution circuit, means for superimposing a high-frequency current thereon and means for controlling the frequency of said current in accordance with the current flowing in said circuit.

2. An electrical system comprising a power distribution circuit, means for superimposing a high-frequency current thereon and means including a variable resistor for controlling the frequency of said current in accordance with the current flowing in said circuit.

3. An electrical system comprising a power distribution circuit, means for superimposing a high-frequency current thereon and means for controlling the frequency of said current in accordance with the magnitude of a measured quantity.

4. An electrical system comprising a power distribution circuit, means for superimposing a high-frequency current thereon and means including a variable resistor for controlling the frequency of said current in accordance with the magnitude of a measured quantity.

5. The combination with a source of variable-frequency oscillations, of a power-distribution circuit, a variable resistor for controlling the frequency of said oscillations, and means responsive to the current traversing said circuit for controlling said resistor.

6. In combination, a power-distribution circuit, a thermionic oscillation generator including a variable resistor for controlling the frequency of the oscillations generated, and means affected by the current traversing said circuit for controlling said resistor.

7. In combination, a power-distribution circuit, a thermionic oscillation generator including a capacitance, a variable resistor shunting said capacitance for controlling the frequency of the output of said generator and means responsive to the current traversing said circuit for controlling said resistor.

EARL R. EVANS.